2,983,870

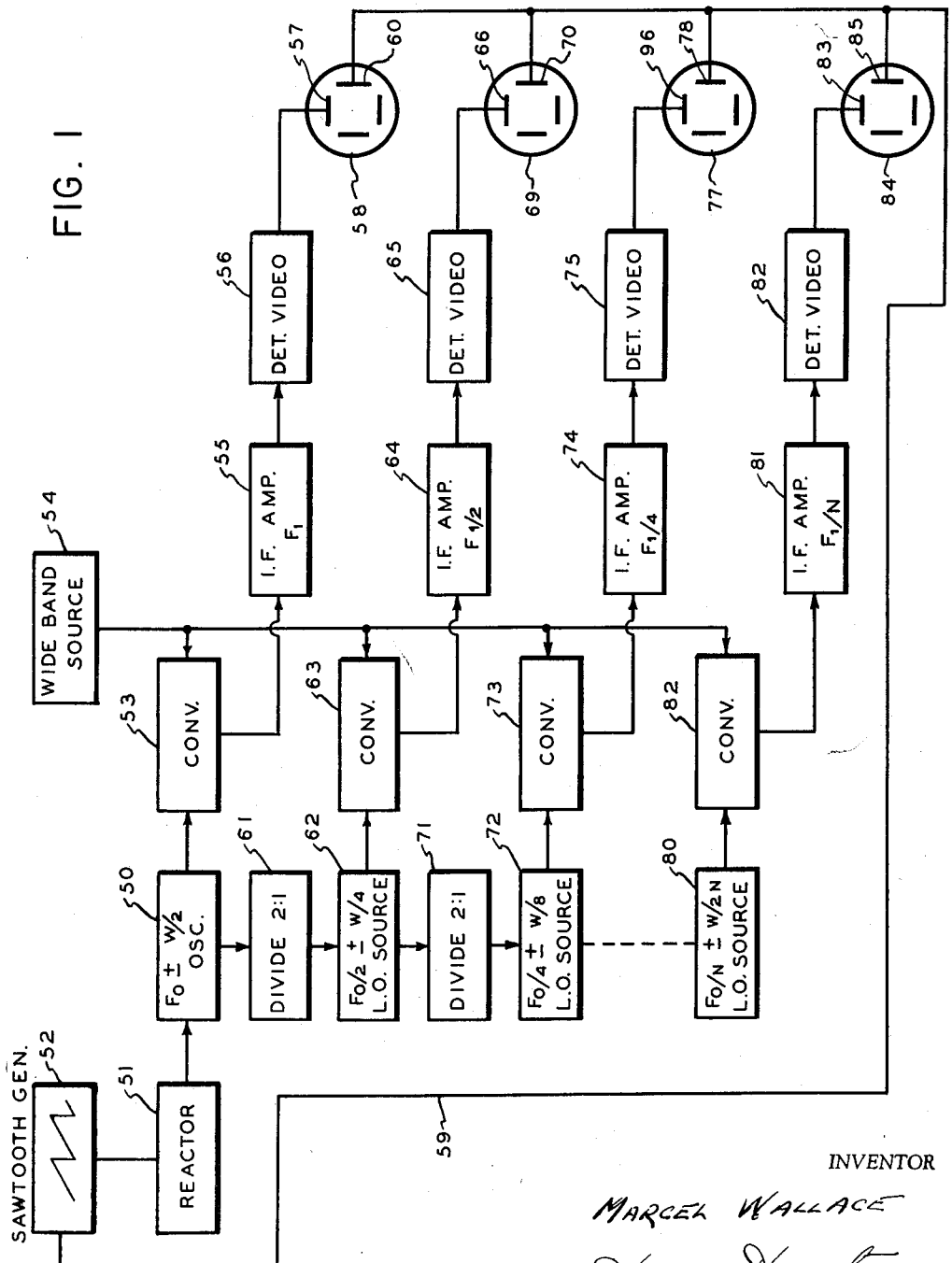

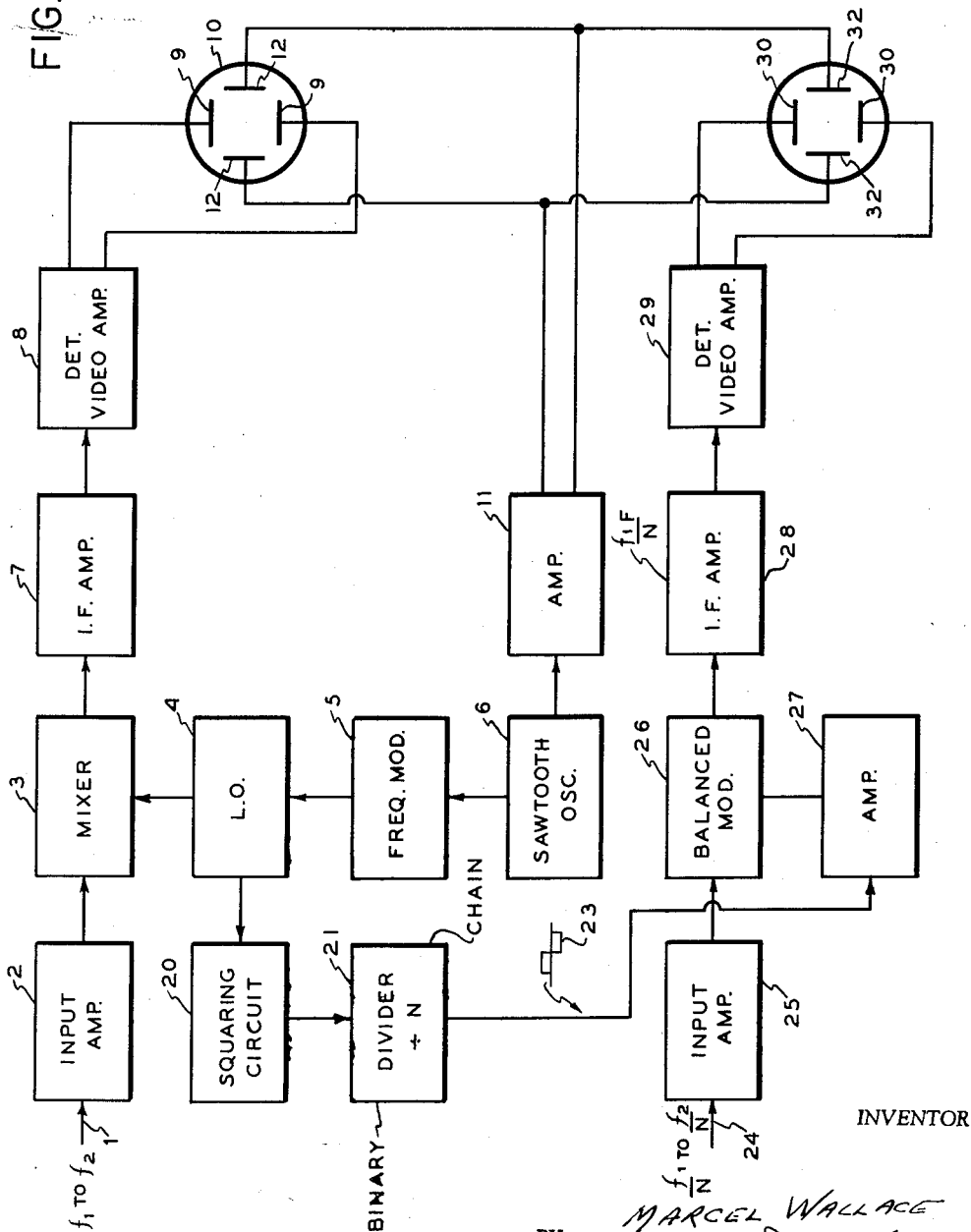

MULTIPLE BAND SPECTRUM ANALYZER

Marcel Wallace, Byram, Conn., assignor to Panoramic Radio Products, Inc., Mount Vernon, N.Y., a corporation of New York Filed July 3, 1956, Ser. No. 595,710

26 Claims. (Cl. 324—77)

The present invention relates generally to superheterodyne analyzers capable of analyzing bands of frequency including components which may extend to a fraction of a cycle per second, and to composite spectrum analyzers which are capable of analyzing a pluraltiy of frequency bands simultaneously.

The general character of panoramic spectrum analyzers is well known in the art, involving generally an input circuit for translating the spectrum of frequencies to be analyzed, a wide band mixer to the input of which a spectrum of frequencies is applied, a source of local oscillations for application to the mixer to effect heterodyning of the spectrum of frequencies, a narrow band intermediate frequency amplifier coupled to the output of the mixer, which accepts only a relatively small part of the total frequency spectrum to be analyzed, and means for frequency modulating the source of local oscillations to effect translation of successive portions of the frequency spectrum to be analyzed into the intermediate frequency amplifier. The action of the system is then effectively to sweep the frequency spectrum to be analyzed past the narrow band I.F. amplifier, the latter abstracting from the frequency spectrum in succession small increments of signal distributed along the spectrum. The signals present in the I.F. amplifier may be detected and the resulting video signals amplified and applied to modulate or deflect the cathode ray beam of an oscilloscope, a sweep voltage which is functionally related to the frequency of the local oscillator being simultaneously applied to the beam, to provide a frequency base against which signal responsive modulations or deflections may be observed.

Systems of the above character have been described in United States Patent Number 2,381,940, issued to Marcel Wallace, and patents referred to therein.

The present invention relates to improvements of systems of the above character, especially when the latter are applied to the analysis of wide portions of the frequency spectrum, to the analysis of plural spectra in plural analyzers which operate in interlocked relation, or which utilize system elements in common, and especially when applied to the analysis of extremely low frequency spectra, which may include frequencies of less than 1 c.p.s. In the latter use the problem arises of generating a local oscillator frequency having extreme stability, and which is susceptible to accurate linear frequency modulation over a relatively narrow band of frequencies. For example, in one commercial embodiment of a system in accordance with the present invention it is desired to analyze a band of frequencies extending from .4 c.p.s. to 200 c.p.s. The local oscillator frequency must be one which is sufficiently accurate and stable, and which may be accurately frequency modulated over a band slightly greater than 200 c.p.s. wide. The I.F. band-width of the system, must be low, in order to permit attainment of selectivities of a small fraction of a cycle. The frequency deviations required in the local oscillator frequency become high, on a percentage basis. For example, if an I.F. frequency of 1000 c.p.s. is selected the local oscillator frequency is required to be frequency modulated between values of approximately 1000 c.p.s. to 1200 c.p.s.; i.e., approximately 20 percent. It has been found that attainment of these several objectives is difficult at the low frequencies specified.

In accordance with one feature of the present invention, the required frequency modulated local oscillator frequency is generated by frequency division from a relatively high frequency-modulated oscillator. The latter may readily be made stable, and requires frequency modulation over a readily attainable band of frequencies for which effective circuitry is available. The problem of accurate frequency division is solved, in accordance with a feature of the invention, by counting down by means of cascaded bi-stable circuits, i.e., if the required division factor is N, the cycles of the high frequency oscillator are counted down in steps, the last of which has the required frequency. The fact that frequency division is digital assures that the division process will be carried out precisely and without error. The low frequency local oscillator signal consists, because of the manner in which it is derived, of a series of square waves, which may be represented by a series of harmonically related frequencies, one of which is equal to the repetition rate of the square waves. That one frequency is automatically selected from the remaining frequencies by the I.F. amplifier of the system. That this is the case may be made evident by considering that the total swept band is approximately 200 c.p.s., and that the fundamental local oscillator frequencies generated extend from just above 1000 to 1200 c.p.s., for the recited example. The first possible harmonic frequency therefore falls at 2000 c.p.s. and the latter frequency can under no circumstances form a conversion product with any frequency present in the local oscillator spectrum, in the band of frequencies being analyzed, which falls in the acceptance band of the I.F. filter. By properly selecting the wave form, i.e., by assuring that the wave form shall be of true square form with equal half periods, even harmonics are not present, so that the first harmonic frequency falls at 3000 c.p.s. If a balanced modulator is employed as a mixer, moreover, no local oscillator frequencies may be directly transferred to the output of the mixer, which again insures freedom from spurious responses in the system due to conversion products of the square wave local oscillator signal.

The low band system above briefly described may be combined with a relatively high band spectrum analyzer, having its own local oscillator, I.F. amplifier, frequency modulator and cathode ray tube indicator. In such case duplication of the functions of certain elements of the high band analyzer are feasible. For example, the frequency modulated sinusoidal local oscillator signal of the high band analyzer may be employed as an input signal for the frequency divider chain which generates the square wave local oscillator signal for the low band analyzer, and the sweep signal generator for the cathode ray tube indicator may be common to both analyzers. The same division factor N which determines the relation between the frequencies of the several local oscillator signals then also determines the relation of the widths of the swept bands. For example, if the high frequency band includes the frequencies 40 c.p.s. to 20 kc., the low frequency band may extend from .4 c.p.s. to 200 c.p.s., i.e., the lowest frequency in the high band may be $N=100$ times the lowest frequency in the low band, and the highest frequency in the high band may be $N=100$ times the highest frequency in the low band.

To generalize, if the ratio of local oscillator frequencies employed in the high band to that employed in the low band be N, the ratio of bandwidths covered by the separate analyzers will also be N. The ratio of the I.F. frequencies employed in the separate analyzers is also then constrained to be N, and it can be shown that the selectivities of the separate I.F. channels for optimum response should then be approximately $\sqrt{N}$, i.e., the low band analyzer may have better resolution than the high band analyzer, which is required in order effectively and adequately to separate the closely related frequencies which may occur at the lower portion of the low band. In the example provided as exemplary, wherein the low band extends from .4 c.p.s. to 200 c.p.s., and the high band from 40 c.p.s. to 20 kc., $N=100$, for example, resolutions of the order of .1 c.p.s. may be required for the low band. In the high band, for a minimum frequency of 40 c.p.s. a resolution of 1 c.p.s. ($\sqrt{N}\times.1$ c.p.s.) may be considerably better than is necessary for practical employment of the system.

In a more general sense a system in accordance with the present invention may be arranged for analysis of a series of adjacent frequency sub-bands, each extending from the other by a fixed multiplication factor, and more particularly each may extend over an octave, i.e. F to 2F, 2F to 4F, 4F to 8F, 8F to 16F . . . , or F to ½F, ½F to ¼F . . . . The analysis of each sub-band may be displayed on a separate indicator, and obviously, if desired, any specific sub-band may be omitted, so that discrete and separated sub-bands of a wide band may be displayed.

While I have stressed the application to octavely separated bands of frequencies, more generally any rational division or multiplication factor may be employed, such as 3, 1/3, 10, 1/10, 3/2, 2/3, etc., and in general the division or multiplication factor employed will be denoted by the letter N.

The general principle involved is to employ one master frequency modulated oscillator, for a plurality of channels, and to divide or multiply the frequency of the latter by means of counter chains, to derive local oscillator frequencies for the several channels. Thereby, a precise relationship between local oscillator frequencies of a plurality of spectrum analyzers may be maintained, as well as an accuracy of local oscillator frequency for all the bands, which is the same as obtains for the master oscillator.

By a process of frequency division it is possible to obtain extremely low frequency local oscillations, of the order of a fraction of a cycle per second, which are accurately frequency modulated and easily controlled.

Counting down of frequencies is particularly advantageous because of the ease of application, and the fact that spurious signals generated in the counting process are easily distinguished from, and separated from the desired signals.

Assume a superheterodyne spectrum analyzer designed for analyzing a band of frequencies extending $W/2$ c.p.s. on either side of a center frequency $F_s$. An I.F. center frequency $F_I$ may be employed, and a local oscillator having a mean frequency $F_0$, frequency modulated over a band $W/2$ c.p.s. Then $$F_0 = F_s + F_I \quad (1)$$

If we apply a multiplication or division factor N to the local oscillator frequency $F_0$, $$NF_0 = N(F_s + F_I) \quad (2)$$

The center frequency of the I.F. channel is thus established. If we consider that the original local oscillator was frequency deviated over a band W c.p.s. the new local oscillator frequency will be deviated over a band NW c.p.s.

It follows that if a first spectrum analyzer, for analyzing a first sub-band of a wide band, covers an octave, and if local oscillator frequencies for additional sub-band spectrum analyzers are obtained by successive multiplications (or divisions) by 2, and if the center frequencies of the several sub-band I.F. channels are selected in accordance with the above equations, that each of the sub-band spectrum analyzers will cover an octave, and these octaves will lie end to end.

It has been shown that, in accordance with the principles of the present invention, the I.F. frequencies employed in analyzing separate sub-bands of a wide band of frequencies must be multiplied by the same factor N as is applied to the local oscillators, and that the bands swept, or the extent of each sub-band, is derived from one adjacent, by multiplying by N. Here N may be any rational number. In order to maintain optimum resolution for the several sub-bands it is necessary to modify the selectivity, or band-pass, of the I.F. channels. Generally, it is known that $$R_{opt} = \sqrt{Wf}$$

where R is optimum resolution, W is the swept band, and $f$ is rate of sweep in cycles per second per second. Since the time or duration of sweep is the same for all the sub-bands, while the value of W is multiplied or divided by N, the rate of sweep in c.p.s. remains the same for all sub-bands, i.e. $f$ is a constant. But since W varies with N $$R_{opt2} = \sqrt{NWf} = \sqrt{N}R_{opt}$$

i.e. the optimum resolution of a sub-band derived from another band by frequency multiplication or division of local oscillator and I.F. frequencies by a factor N, $R_{opt}$ is varied by a factor $\sqrt{N}$, and the band-width of the I.F. channel, or the Q of the I.F. channel, must be modified accordingly.

It is, accordingly, an object and feature of the present invention to provide a panoramic system having a source of square wave frequency modulated local oscillator signals.

It is a further feature and object of the present invention to provide a panoramic system in which frequency-modulated low frequency square wave local oscillator signals are generated by a process of frequency division from a relatively high frequency frequency modulated sine wave local oscillations.

It is another object of the present invention to provide a system of spectrum analysis in which frequency modulated square wave local oscillator frequencies are employed to beat with the frequencies of a band of frequencies subject to analysis, in which the lowest local oscillator frequency employed is higher than the highest frequency in the band of frequencies subject to analysis.

It is still another object of the present invention to provide a system of spectrum analysis including two analyzers having discrete indicators for two discrete but overlapping frequency bands, each of the analyzers including a relatively narrow band I.F. filter, appropriate in selectivity for the resolution desired, the high band analyzer including a sinusoidal frequency modulated local oscillator and the low band analyzer including a binary divider chain for deriving square low frequency wave local oscillator signal from the sinusoidal frequency modulated local oscillator, the division factor, the band sweep, the local oscillator frequencies, the I.F. frequencies and the I.F. selectivities being selected for optimum overall performance of both analyzers.

It is still another feature of the invention to provide a novel superheterodyne receiver which is adapted to tuning with extreme accuracy over a narrow band of frequencies, wherein local oscillations for the receiver are generated by means of a binary divider chain, employing cascaded flip-flops, from a relatively high frequency tunable oscillator.

It is a generic object of the present invention to provide a system of spectrum analyses for analyzing separate sub-bands of a wide frequency band with equal stability for all the sub-bands.

It is another object of the invention to provide a system for analyzing a plurality of sub-bands of a wide frequency band, which are octavely related, without overlap.

It is still another object of the present invention to provide a sub-sonic spectrum oscillator of high stability.

It is a further object of the invention to derive a plurality of different frequency modulated local oscillator frequencies for superheterodyne spectrum analyzers by a process of binary multiplication by a factor N, where N is any rational number.

The above and still further objects, features and advantages of the present invention will become apparent upon consideration of the following detailed description of one specific embodiment thereof, especially when taken in conjunction with the accompanying drawings, wherein:

Figure 1 is a functional block diagram of a specific system in accordance with the invention; and Figure 2 is a block diagram of a further system in accordance with the present invention, which lends itself to explanation of the basic principles thereof.

Referring now more specifically to Figure 1 of the accompanying drawings, the reference numeral 1 denotes a source of a band of frequencies W cycles wide and extending between values $f_1$ and $f_2$, $f_2$ being the higher frequency. The input band $W=f_2-f_1$ is amplified in an input amplifier 2 and applied to an input circuit of a mixer 3. A local oscillator 4 is provided, which is frequency modulated periodically over a range as wide as W c.p.s. by means of a reactance tube modulator 5, operating in response to repetitive saw-tooth modulating voltage supplied by an oscillator 6. The output of the frequency modulated or frequency scanning oscillator 4 is applied to mixer 3, where conversion products are formed and amplified in the relatively narrow band I.F. amplifier 7. The output of the latter is detected and video amplified in a detector and video amplifier 8, and the resultant video signal applied to the vertical deflection electrodes 9 of a cathode ray tube indicator 10.

The output of saw-tooth oscillator 6 is amplified in an amplifier 11, and applied to the horizontal deflection electrodes 12 of cathode ray tube indicator 10.

The frequencies $f_0$ scanned by the oscillator 4 are arranged to exceed the frequencies in the input band, i.e., the lowest local oscillator frequency is greater than the frequency $f_1$, and the highest local oscillator frequency than the frequency $f_2$ by a difference $f_{IF}$, to which the I.F. amplifier 7 is tuned. The selectivity of the I.F. amplifier 7 is selected to provide satisfactory visual resolution between adjacent frequencies in accordance with principles explained in considerable detail in the U.S. patent to Tongue, #2,661,419, and elsewhere. The system as described in detail to this point is conventional.

In accordance with the invention the output of local oscillator 4, which is sinusoidal, is clipped to provide a substantially square wave corresponding in frequency to the frequency of the local oscillator, by means of a squaring circuit 20. The square waves 23 so formed are then counted down by a factor of N by means of a binary divider chain, 21, consisting of cascaded flip-flops, in accordance with well known principles. The output signal derivable from the divider chain 21 consists of square waves 22, of frequency $$\frac{f_0}{N}$$

Such waves are known to be equivalent to a series of harmonically related Fourier components of frequency $$\frac{f_0}{N}, \frac{3f_0}{N}, \frac{5f_0}{N} \ldots$$

etc.

A second band of frequencies which is to be the subject of spectrum analysis extends over the range $$\frac{f_1}{N} \text{ to } \frac{f_2}{N}$$

This band of a width of $W/N$ c.p.s. is applied via lead 24, and amplified in an amplifier 25, where it is applied to an input circuit of a balanced mixer 26. The square wave signals 23, which extend in frequency over a band $W/N$ c.p.s.

$$\left(\text{as wide as } \frac{f_1}{N} \text{ to } \frac{f_2}{N}\right)$$

but displaced therefrom by the frequency $$\frac{f_{IF}}{N}$$

is applied to the balanced modulator 26 via an amplifier 27, in such relation that none of the local oscillator frequencies, per se, appears at the output of the mixer. Conversion products are generated in the mixer 26, one with each of the Fourier components of the square wave 23. Only the fundamental, however, produces conversion products which fall within the pass band of the I.F. amplifier 28, tuned to the frequency $$\frac{f_{IF}}{N}$$

Amplified signal is derived from the I.F. amplifier 28 and detected and amplified in a detector and amplifier 29. The output of the latter is applied to the vertical deflection electrodes 30 of a cathode ray tube indicator 31, having horizontal deflection electrodes 32.

The saw-tooth output of amplifier 11 may be applied directly to the electrodes 32, to provide horizontal scan of the electron beam of the indicator 31 in synchronism with frequency scanning.

The I.F. selectivity of the I.F. amplifier 28 may now be lower than that of I.F. amplifier 7, since the rate of frequency scan through I.F. amplifier 28 is smaller by a factor N than that present in the I.F. amplifier 7, as evidenced by the fact that the width of the band of frequencies applied to input lead 24 is $1/N$ times that applied to lead 1, yet the time elapse per scan is the same in the two cases.

While a balanced mixer 26 is employed, this is not essential to the system since the selectivity of the I.F. amplifier may be sufficiently great to discriminate against feed-through of local oscillator frequencies. Similarly, the utilization of square wave local oscillator signals is not essential, but is inherently provided in binary divider chains. Other types of divider chains may produce other wave shapes, but in any case the wave shape employed will include fundamental and harmonic components. So long as the I.F. frequency is greater than the width of the band of frequencies subject to analysis, the harmonic frequencies, as distinguished from the fundamental, will not produce conversion products falling within the I.F. pass band.

In accordance with one preferred example of the present invention, the frequencies $f_1$ and $f_4$ are 40 c.p.s. and 20 kc., respectively, and the division factor $N=100$. The lower frequency band then extends from .4 c.p.s. to 200 c.p.s. The frequency of I.F. amplifier 28 is 1000 c.p.s. and its selectivity indicated by a Q value of the order of 10,000. The frequencies of the wave 23 are then required to extend from 1000.4 to 1200 c.p.s.

Referring now particularly to Figure 2 of the accompanying drawings, the reference numeral 50 denotes a master oscillator having a center or mean frequency $F_0$ and which is frequency modulated over a band extending $$\frac{W}{2}$$

cycles per second on either side of the mean frequency, so that the total frequency excursion of the oscillator 50 is equal to W c.p.s. Frequency modulation of the oscillator 50 is accomplished by a reactance tube modulator 51, which is in turn driven by a saw-tooth generator 52. The latter may be linear, or may be logarithmic, both types of scan being per se well known in the art.

The oscillator 50 supplies a frequency converter or mixer 53 to which is also supplied signal from a wide band source 54. An intermediate frequency amplifier 55 is connected to an output circuit of frequency converter or mixer 53, the amplifier 55 having a mid-frequency $F_I$. If the mid-frequency of the converted frequency band is denoted by the letter $F_s$, the relationship exists that $F_0 = F_s \pm F_I$. On this basis a sub-band taken from the wide source 54, having a mean frequency $F_s$ and a total width W is being converted in converter 53 to an intermediate frequency $F_I$ during frequency excursions of the oscillator 50, successive portions of the band $$F_s \pm \frac{W}{2}$$

being selected by the I.F. amplifier 55 as the oscillator scans.

The output of I.F. amplifier 55 is applied to a video detector and amplifier 56, and the output of the latter is applied to the vertical deflection electrode 57 of a cathode ray tube indicator 58. The saw-tooth output of the saw-tooth generator 52 is applied via a lead 59 to a horizontal deflection electrode 60 of the cathode ray tube indicator 58. Accordingly, there is generated on the face of the cathode ray tube indicator 58 a panoramic presentation of the frequency content of a sub-band of frequencies W c.p.s. wide centered on a frequency $F_s$.

The output of the oscillator 50 is divided by a factor of two in a binary counter chain 61, resulting in generation of a local oscillator frequency $$\frac{F_0}{2} \pm \frac{W}{4}$$

which is filtered from the counter chain by means of a filter 62. It will be noted that by reason of the specific division factor selected the frequency swept by the source 62 is actavally related to that swept by the source 50, if the total frequency band W occupies one octave. For example, if the local oscillator 50 sweeps over a band 1000 to 2000 kilocycles per second the source 62 will provide oscillations over a band 500 to 1000 kilocycles per second. The process of division by two, where an octaval band is available to begin with, results in further end to end octaval bands, so long as the division factor is maintained, and however many divisions may occur, since the total band swept by the oscillator is divided by a factor of two in the division process and not alone the center frequency of the swept band.

The local oscillation source 62 supplies a converter or mixer 63 to which is supplied signal from the wide band source 54. The converter 63 supplies an I.F. amplifier 64 having a mid-frequency $$\frac{X_I}{2}$$

Accordingly, that part of the wide band spectrum is converted which corresponds with frequencies $$\frac{X_s}{2} \pm \frac{W}{4}$$

The output of the I.F. amplifier 64 is supplied to a detector and video amplifier 65 which in turn supplies deflection signals to the vertical deflection electrodes 66 of a cathode ray tube indicator 69. The latter is supplied with horizontal deflection voltage from the lead 59, i.e. is supplied with the same deflection voltage as is the horizontal deflection electrode 60 of cathode ray tube indicator 58.

The output of source 62, derived by frequency division by a factor of two of the output of oscillator 50, is further divided by a factor of two in a binary divider 71, providing a local oscillation source 72 having an enter frequency $$\frac{X_0}{4}$$

and frequency excursions $$\pm \frac{W}{8} \text{ c.p.s.}$$

The source 72 supplies a converter 73 to which is also supplied signal from the wide band source 54, corresponding with that part of the wide band spectrum having frequencies $$\frac{X_s}{4} \pm \frac{W}{8}$$

The output of converter 73 is applied to an I.F. amplifier 74, which has a mean frequency $$\frac{F_I}{4}$$

The output of the I.F. amplifier 74 is applied to a detector and video amplifier 75, the output of which is utilized as a vertical deflection voltage for application to vertical deflection electrode 76 of cathode ray tube indicator 77. The latter includes a horizontal deflection electrode 78, which is supplied with saw-tooth voltage from the lead 59. Accordingly, the cathode ray tube indicator 77 provides a visual display of the frequency content of a spectrum centered on the frequency $$\frac{F_s}{4}$$

and having frequency deviations $$\pm \frac{W}{8}$$

The process of frequency division may be continued as far as desired, each time by a factor of two. Each division by two leads to a further spectrum analyzer channel, terminating in a cathode ray tube indicator on the face of which is displayed one octave of the frequencies present in the band supplied by the wide band source 54. Moreover, the displays of adjacent cathode ray tubes derived from adjacent portions of the wide band source, subsist in end to end relation, without gaps.

At the last channel illustrated in Figure 2 of the accompanying drawings, generalized values have been indicated, i.e. the division factor, instead of being a specific number, is the general number N so that frequency division is by a factor of N, the center frequency of the oscillator 80 is $$\frac{F_0}{N}$$

and its frequency excursions $$\pm \frac{W}{2N}$$

The I.F. amplifier 81 has a mean frequency $$\frac{X_I}{N}$$

and the portion of the wide band spectrum supplied by source 52 which is subject to analysis extends over the frequency bands $$\frac{X_a}{N} \pm \frac{W}{2N}$$

it being this band which is supplied by the converter 82. The output of the I.F. amplifier 81 is detected and amplified in a detector and video amplifier 82 the output of which is applied to the vertical deflection electrodes 83 of a cathode ray tube indicator 84, as vertical deflection voltages. To the horizontal deflection electrode 85 of cathode ray tube indicator 84 is supplied deflection voltage from the lead 59.

While the presentation of successive octaves of a wide band spectrum has advantages, the system of the present invention is not limited to presentation of successive octaves. Frequency division may occur by any desired factor, and in place of frequency division frequency multiplication may be resorted to. Moreover, it will be evident that any portion of the wide band spectrum supplied by source 54 may be omitted if desired, so that the system may be employed to analyze discrete portions or sub-bands of the available spectrum, which are not connected in end to end relation without gaps. Other modifications and re-arrangements of the present system will suggest themselves to those skilled in the pertinent art, and more particularly it will be realized that it may prove desirable to provide overlap of displays, as is the case in the embodiment of my invention illustrated in Figure 1 of the accompanying drawings.

The question of optimum resolution for the several amplifiers 55, 64, 74 and 81 has been dealt with hereinabove, in the explanation of the relationships existing among the several significant quantities pertaining to design of systems in accordance with the invention. More particularly if the I.F. amplifier 55 has optimum resolution for a given value of Q, the value of Q for the I.F. amplifier 64 may be $$\frac{Q}{\sqrt{N}}$$

and that of the I.F. amplifier 74

$$\frac{Q}{\sqrt{2N}}$$

and so on, when the value of N in each case is the multiplication factor applicable to the particular channel for which Q is calcuated. So, higher and higher resolutions may be utilized for the channels which analyze the narrower lower frequency bands, and the desired numerical relationships among the several Q values employed may be readily derived, one from the other.

While I have described and illustrated two specific embodiments of my invention, it will be clear that variations of the general arrangement and of the details of construction which are specifically illustrated and described may be resorted to without departing from the true spirit and scope of the invention as defined in the appended claims. More particularly, where multiple cathode ray tube indicators are referred to in the disclosure, multiple gun cathode ray tubes may be employed, since these essentially consist of plural tubes in a single envelope.

What I claim is:

1. A signal receiver of the superheterodyne type for receiving a band of frequencies in the band $f_1$ to $f_2$, including a mixer and means for generating local oscillations, wherein said means for generating local oscillations includes a relatively high frequency source of frequency F, a digital frequency divider chain having a division factor N responsive to said source of frequency F for generating a frequency $$\frac{F}{N}$$

where $F/N$ is greater than either $f_1$ or $f_2$, and means for deriving said local oscillations from said digital frequency divider chain.

2. A signal receiver of the superheterodyne type for receiving a band of frequencies in the band $f_1$ to $f_2$, where $f_2$ is greater than $f_1$, a mixer having an input circuit and an output circuit, and means for generating local oscillations coupled with said mixer input circuit, and an intermediate frequency amplifier of frequency $f_{IF}$ coupled with said mixer output circuit, said mixer and said means for generating local oscillations and said intermediate frequency amplifier being all interconnected in the superheterodyne configuration, and wherein said means for generating local oscillations includes a tunable oscillator of frequency F and means comprising a counting chain for dividing said frequency F to obtain a frequency $$\frac{F}{N}$$

where $F/N$ has values extending from $$\frac{f_{IF}}{N} + \frac{f_1}{N} \text{ to } \frac{f_{IF}}{N} + \frac{f_2}{N}$$

and where $F/N$ is the local oscillator frequency.

3. A panoramic system for spectrum analyzing a lower frequency band and a higher frequency band, comprising a device for spectrum analyzing said higher frequency band, said device including a first frequency converter, said first frequency converter comprising a mixer and a frequency scanning oscillator, a first narrow band intermediate frequency amplifier for amplifying output signals derivable from said first frequency converter in succession in response to frequency scanning of said frequency scanning oscillator, reactor means for varying the frequency of said oscillator periodically, a source of periodically varying voltage operating in synchronism with said reactor means, said reactor means being responsive to said source of periodically varying voltage and a further device for spectrum analyzing said lower frequency band, said further device including a further frequency converter, said further frequency converter comprising a further mixer and a further source of further frequency scanning local oscillations, said further source of further frequency scanning local oscillations including a counter chain responsive to said first frequency scanning oscillator for generating said further frequency scanning local oscillations by counting down the frequency of said first frequency scanning oscillator, said further device further including a further intermediate frequency amplifier for amplifying output signals derivable from said further mixer in succession in response to frequency scanning of said further frequency scanning local oscillations.

4. The combination in accordance with claim 3 wherein said higher frequency band extends between frequencies $f_1$ and $f_2$, and said lower frequency band extends between frequencies $$\frac{f_1}{N}$$

to $$\frac{f_2}{N}$$

where N is the division factor of said counter chain, and wherein the first narrow band intermediate frequency amplifier is tuned to a frequency N times the frequency to which said further intermediate frequency amplifier is tuned.

5. The combination in accordance with claim 4 wherein the further frequency scanning local oscillations are rectangular waves.

6. The combination in accordance with claim 5 wherein the fundamental frequency of said further local oscillations is greater than $$\frac{f_2}{N} - \frac{f_1}{N}$$

7. A system of spectrum analysis including a first superheterodyne channel for analyzing the frequency content of a first sub-band of a wide band of frequencies, a second channel for analyzing the frequency content of a second sub-band of said wide band of frequencies, each of said channels including a separate source of frequency scanning local oscillations, a separate mixer, a separate I.F. amplifier and a separate visual indicator, wherein at least one of said sources of frequency scanning local oscillations includes means for deriving local oscillations by a process of frequency multiplication of the frequency of the other of said sources of frequency scanning local oscillations by a factor N, where N may be any rational number and wherein the ratio of the center frequencies of said I.F. amplifiers is N.

8. A superheterodyne system of spectrum analysis comprising a first source of frequency scanning local oscillations of mean frequency $F_0$ and of deviation $$\pm \frac{W}{2}$$

a source of wide band signals including a first sub-band of center frequency $F_s$ and width W, an I.F. amplifier of mean frequency $F_I$ and selectivity factor Q, a first mixer responsive to said sub-band and to said local oscillations to generate said frequency $F_I$, a second source of frequency scanning local oscillations of mean frequency $$\frac{F_0}{N}$$

and of deviation $$\pm \frac{W}{2N}$$

said source of wide band signals including a second sub-band of center frequency $$\frac{F_s}{N}$$

and of width $$\frac{W}{N}$$

a second I.F. amplifier of means frequency $$\frac{F_I}{N}$$

and a second mixer responsive to said second source of local oscillations and to said second sub-band to generate said frequency $$\frac{F_I}{N}$$

where N is any rational number greater than unity, wherein one of said sources of frequency scanning local oscillations is responsive to the other of said sources of frequency scanning local oscillations.

9. The combination in accordance with claim 8 in which said second source of frequency scanning local oscillations includes means for counting down the frequency of said first source of frequency scanning local oscillations.

10. The combination in accordance with claim 9 wherein the uppermost value of W is two times the lowermost value of W.

11. The combination in accordance with claim 9 wherein said bands W and $$\frac{W}{N}$$

subsist without gaps therebetween in said wide band of signals.

12. The combination in accordance with claim 9 wherein said bands W and $$\frac{W}{N}$$

subsist end to end.

13. A system of spectrum analysis for a wide band of frequencies, comprising a plurality of mixers, means for applying said wide band of frequencies to said mixers in parallel, a plurality of I.F. amplifiers connected each to a different one of said mixers, a separate detector and video amplifier connected in cascade to each of said I.F. amplifiers, a separate cathode ray tube indicator for each of said video amplifiers, said cathode ray tube indicators each having means for generating a cathode ray beam and means for deflecting said beam in a first coordinate direction in response to signal supplied by one of said video amplifiers, each of said cathode ray tube indicators including means for deflecting said beam in a second coordinate direction, a single source of deflection voltage, means for applying said deflection voltage in parallel to all said means for deflecting said beam in a second coordinate direction, a source of a plurality of local oscillations, one for each of said mixers, said source of a plurality of local oscillations comprising a master source of oscillations and binary counting chain frequency multipliers connected in cascade to said master source of oscillations, and means for frequency modulating said master source of oscillations in response to said deflection voltages, whereby said local oscillations have frequencies related each to the other by a multiplication factor N, where N is any rational number.

14. The combination in accordance with claim 13 wherein the center frequencies of said I.F. amplifiers are related each to the other by said multiplication factor N.

15. The combination in accordance with claim 13 wherein said factor N is a division factor equal to 2 for all said oscillators and I.F. amplifiers.

16. The combination in accordance with claim 15 wherein the Q factors of all said I.F. amplifiers are related one to another by the factor $\sqrt{N}$.

17. The combination in accordance with claim 13 wherein the center frequencies of said I.F. amplifiers and the Q factors of said I.F. amplifiers are selected to generate displays on said cathode ray tube indicators in composite which represent all frequencies of said wide band of frequencies with optimum resolution.

18. The combination in accordance with claim 17 wherein each cathode ray tube indicator displays one octave of said wide band of frequencies.

19. A frequency scanning spectrum analyzer for analyzing a first and a second band of frequencies, said first and second bands of frequencies being non-coincident, the lowermost frequency of said first band of frequencies being $F_1$ and the lowermost frequency of said second band of frequencies being $F_2$, when $$\frac{F1}{F2}$$

is a number different than unity, comprising a first frequency converter, means applying said first band of frequencies to said first frequency converter for frequency conversion thereby, said first frequency converter including a first source of first local oscillations, means for varying the frequency of said first local oscillations over a range of values as wide as said first band of frequencies, an intermediate frequency amplifier coupled to said frequency converter for deriving conversion products therefrom, a visual indicator having means for generating a first visual display and means for modulating said first display in two coordinate senses, respectively, in accordance with the amplitude of said conversion products and the frequency of said first local oscillations, means for deriving second local oscillations from said first local oscillations by counting chain frequency multiplication by a factor N, a mixer, means for applying said second local oscillations and said second band of frequencies to said mixer for frequency conversion thereby, a second intermediate frequency amplifier coupled to said mixer for deriving further products of conversion therefrom, and a second visual indicator having means for generating a second visual display, and means for modulating said second visual display in two coordinate senses, respectively, in accordance with the amplitude of said further products of conversion and the frequency of said first local oscillations.

20. In combination, a first superheterodyne receiver having an input circuit and a first source of local oscillations, means for applying to said input circuit of said first superheterodyne receiver, a first band of frequencies extending over the range $F \pm W/2$, means for tuning said first source of local oscillations over a band of frequencies $F_0 \pm W/2$, a second superheterodyne receiver having a second source of local oscillations and an input circuit, means for applying to said input circuit of said second superheterodyne receiver a second band of frequencies $NF \pm NW/2$, where N is a multiplication factor not including unity, means for tuning said second source of local oscillations over a band of frequencies $NF_0 \pm NW/2$, and means for deriving one of said local oscillations from the other of said local oscillations, said last means comprising a counter device for multiplying frequency by said fixed factor N, wherein N includes values selected from the numbers 2, 4, 8 . . . and 1/2, 1/4, 1/8 . . . .

21. In a spectrum analyzer, a first oscillator for providing first local oscillations, signal responsive means for tuning said first local oscillator over a band $F_0 \pm W/2$ cycles per second, means for deriving from said first local oscillator by frequency division second local oscillations variable over a band $F_0 \pm W/4$ cycles per second, a source of sawtooth tuning signal, means for applying said sawtooth tuning signal to said means for tuning, a source of a wide band of frequencies to be analyzed for frequency content, a first frequency converter, a second frequency converter, means for applying said wide band of frequencies jointly to said first frequency converter and said second frequency converter, means for applying said first local oscillations to said first converter, and means for applying said second local oscillations to said second converter, a first intermediate frequency amplifier coupled with said first converter and having a pass frequency $F_1$, a second intermediate frequency amplifier coupled with said second converter and having a pass frequency $F_1/2$, and means for individually plotting the frequency spectrum content of the bands of frequencies converted by said frequency converters.

22. In a system of spectrum analysis, a source of a wide frequency band of signals, an array of frequency converters, means for applying said wide frequency band of signals jointly to all said array of frequency converters, an array of local oscillator sources, means for controlling the frequencies of all but one of said local oscillators from the frequencies of others of said local oscillators, by chain frequency division by the factor 2, means for coupling each of said local oscillator sources to a different one of said frequency converters, means for varying the frequency of said one of said local oscillators over a predetermined band periodically, a separate I.F. amplifier coupled to each of said converters for deriving conversion products from the converters, a separate visual indicator coupled to each of said I.F. amplifiers, each of said visual indicators including an element for generating a visual indication and means for moving said elements for generating a visual indication synchronously with the variation of frequency of any of said local oscillators and all in a coordinate direction.

23. The combination according to claim 22, wherein the frequencies of successive ones of said array of local oscillators is $F_0 \pm W/2$, $F_0/2 \pm W/4$ . . . , where $F_0$ is the center frequency of the local oscillator of highest frequency and W is the total deviation of the latter local oscillator, and wherein the frequencies of successive ones of said I.F. amplifiers are $F_1, F_2/2$ . . . , and the Q factors of said I.F. amplifiers are $Q_1, Q_2/\sqrt{2}$ . . . .

24. In a spectrum analyzer, a source of a wide band of frequencies to be analyzed, a first converter, a first local oscillator of center frequency $F_0$ coupled to said first converter, means for varying the frequency of said first local oscillator over a band $\pm W/2$, a first I.F. amplifier coupled to said first converter and having a center frequency $F_1$ and a Q factor of approximately $Q_1$, a second converter, a source of local oscillations coupled to said second converter, means for deriving said local oscillations from said first local oscillator by frequency division of the output thereof by a factor N where N is different from unity, said second local oscillator having a frequency band $F_0/N \pm W/2N$, a second I.F. amplifier coupled to said second converter, said second I.F. amplifier having a center frequency $F_1/N$ and a Q factor approximately $Q_1/\sqrt{N}$.

25. In a signal receiver of the superheterodyne type, a mixer having a relatively wide band signal input circuit and an output circuit, an intermediate frequency amplifier coupled to said mixer output circuit, a source of local oscillations coupled to said mixer input circuit, said mixer being arranged and adapted to convert the frequency of a signal applied thereto to the frequency of said intermediate frequency amplifier by heterodyning with said local oscillations, wherein is provided means for generating said local oscillations comprising a frequency scanning oscillator, and means for deriving said local oscillations from said frequency scanning oscillator by binary frequency division.

26. A panoramic device, comprising a mixer having input circuits and an output circuit, an intermediate frequency amplifier having an input circuit, means for detecting the output of said intermediate frequency amplifier, means for generating local oscillations, means for applying said local oscillations to said input circuits of said mixer, means for applying a band of signals to said input circuits of said mixer, means for coupling the output circuit of said mixer to the input circuits of said intermediate frequency amplifier, means for generating a visual indication modulatable in two coordinates, means for periodically varying the frequency of said local oscillations over a band of frequencies, means for modulating said visual indication in one of said coordinates synchronously with the variation of local oscillation frequency, means responsive to signals detected by said means for detecting for modulating said visual indication in the other of said coordinates, said local oscillations being of rectilinear wave form, the Fourier frequency components of said local oscillations including multiple frequencies harmonically related to the fundamental frequency of said local oscillations, wherein the frequencies of said band of signals, said intermediate frequency and said Fourier frequency components are so related that only one of said Fourier frequency components forms conversion products with any frequency in said band of frequencies which corresponds with said intermediate frequency, wherein is further provided a source of relatively high frequency oscillations, means for frequency modulating said relatively high frequency oscillations, and means comprising counting chain frequency dividers responsive to the frequency modulated relatively high frequency oscillations for generating said local oscillations.

References Cited in the file of this patent

UNITED STATES PATENTS 1,919,803    Roetken   ---------------- July 25, 1933

(Other references on following page)

UNITED STATES PATENTS

| | | | |
|---|---|---|---|
| 2,084,760 | Beverage | June 22, | 1937 |
| 2,159,493 | Wright | May 23, | 1939 |
| 2,416,791 | Beverage | Mar. 4, | 1947 |
| 2,465,500 | Wallace | Mar. 29, | 1949 |
| 2,484,618 | Fisher | Oct. 11, | 1949 |
| 2,515,271 | Smith | July 18, | 1950 |
| 2,525,679 | Hurvitz | Oct. 10, | 1950 |
| 2,545,232 | Hings | Mar. 13, | 1951 |
| 2,577,758 | Hastings | Dec. 11, | 1951 |
| 2,661,419 | Tongue | Dec. 1, | 1953 |
| 2,669,712 | Rial | Feb. 16, | 1954 |
| 2,704,325 | Taylor | Mar. 15, | 1955 |
| 2,721,936 | Byrne | Oct. 25, | 1955 |
| 2,753,524 | Newsom | July 3, | 1956 |
| 2,782,366 | Wall | Feb. 19, | 1957 |

FOREIGN PATENTS

| | | | |
|---|---|---|---|
| 414,769 | Great Britain | Aug. 13, | 1934 |
| 594,674 | Great Britain | Nov. 17, | 1947 |
| 676,276 | Great Britain | July 23, | 1952 |

OTHER REFERENCES

"A Multi-Channel Noise Spectrum Analyzer for 10–10,000 Cycles, article in The Review of Scientific Instruments, September 1954; pages 899–901.